United States Patent [19]

Thomas

[11] Patent Number: 5,403,128
[45] Date of Patent: Apr. 4, 1995

[54] INSULATION SPRAYING SYSTEM

[76] Inventor: Bruce Thomas, 4750 Blum Rd., Martinez, Calif. 94553

[21] Appl. No.: 944,832

[22] Filed: Sep. 14, 1992

[51] Int. Cl.6 ............................................. B65G 53/08
[52] U.S. Cl. ........................................ 406/39; 406/52; 406/135; 406/151
[58] Field of Search ................... 406/39, 52, 109, 135, 406/151

[56] References Cited

U.S. PATENT DOCUMENTS

| | | | |
|---|---|---|---|
| 2,889,083 | 6/1959 | Schwinhorst | 406/135 |
| 2,890,079 | 6/1959 | Stumpf | 406/135 X |
| 3,210,127 | 10/1965 | Schaben et al. | 406/109 X |
| 3,995,775 | 12/1976 | Birkmeier et al. | 406/135 X |
| 4,129,338 | 12/1978 | Mudgett | 406/135 |
| 4,242,007 | 12/1980 | Ogden et al. | 406/109 |
| 4,249,839 | 2/1981 | Vance | 406/109 |
| 4,572,726 | 2/1986 | Van Abbema | 406/109 X |
| 4,824,295 | 4/1989 | Sharpless | 406/109 |
| 5,114,281 | 5/1992 | Hartnett et al. | 406/39 |

Primary Examiner—David M. Mitchell
Assistant Examiner—Gary C. Hoge
Attorney, Agent, or Firm—James J. Leary

[57] ABSTRACT

A fully integrated insulation spraying system with an insulation spraying subsystem for spraying wet or dry insulation and a fiber recovery subsystem for recycling waste insulation fibers and reintegrating them into the spraying process for more efficient and ecologically sound use of the insulation material. The insulation spraying subsystem includes a hopper with a rotary conveyor that conditions the fiber insulation and carries it into a standby chamber which is connected an airlock that introduces the fibers into a moving airstream. The airstream carries the fibers to the spraying head where moisture is added to promote adhesion of the insulation. A pneumatically powered insulation shaver is provided for smoothing the insulation after it is applied. The fiber recovery subsystem includes a vacuum powered pickup for gathering the waste insulation that is shaved off, a cyclone separator and primary and secondary filters for collecting the fibers, and an airlock for metering the fibers into the airstream of the insulation sprayer. Preferably, the system is mounted on a truck for transportation to a construction site. A self-contained power unit, which operates the air pumps, water pump and mechanical components of the system, further increases the portability and efficiency of the system.

13 Claims, 2 Drawing Sheets

INSULATION SPRAYING SYSTEM

FIELD OF THE INVENTION

This invention relates to an apparatus for spraying insulation material. More particularly, it relates to a system for spraying insulation material which collects process waste and reintegrates it into the spraying process for more efficient and ecologically sound use of the insulation material.

BACKGROUND OF THE INVENTION

Blown insulation is commonly used in the construction industry for insulating building walls, floors and attics. Insulating materials such as fiberglass, rock wool and cellulose fibers are pneumatically blown into open cavities in the building structure to provide thermal insulation. A number of systems have been devised for pneumatically conveying insulation materials for this purpose. Blown insulation is limited in its application to closed cavities or horizontal surfaces because there is nothing other than gravity to hold the insulation in place.

A more recent variation on the blown insulation process is sprayed insulation. Water or an adhesive is added to the insulation material as it is blown into the wall cavity to make it adhere to vertical or overhanging surfaces. With this process, insulation can be quickly and efficiently applied to the framed walls of a newly constructed or renovated building before the wallboard is nailed in place. When the insulation is sprayed into the open wall cavity, it fills in between the wall studs. To make sure that the wall cavity is completely filled, the spray insulation installer typically oversprays the insulation so that it builds up a half inch or an inch beyond the plane of the wallboard. Then, the excess is smoothed off even with the studs using a motorized shaver. This excess insulation is considered process waste and is usually gathered up and disposed of. This wasted insulation material can sometimes account for up to 20% of the insulation used. Careful control of the spraying process can cut down on the overspray to reduce the amount of waste, but this does not come without a price. The increased labor cost of slowing down the spraying process for more control can outweigh the cost of the material saved, and the delay slows down the whole construction project.

Certain spray insulation installers have taken measures to combat the inefficient use of material by gathering up the waste insulation and reintroducing it into the spraying process. This is typically done by shoveling up the insulation shavings with a snow shovel and putting them directly into the main feed hopper or an auxiliary feed hopper of the spraying machine. This process has a number of drawbacks. First, it requires additional labor to gather up the shavings and feed them back into the hopper. Second, the wet lumps of recycled insulation can disrupt material flow in the spraying system. Third, the amount of recycled material added to the virgin insulation is sporadic and inconsistent which can compromise the quality and consistency of the insulation application.

SUMMARY OF THE INVENTION

In keeping with the foregoing discussion, the object of the present invention is to provide a system for spraying building insulation material. Another object of the invention is to provide an insulation spraying system with a means for gathering waste insulation material and reintegrating it into the spraying process. The system should accomplish these objectives in a manner that enhances the quality, consistency and efficiency of the insulation spraying process. A concurrent objective of the present invention is to provide an insulation spraying system which is easily transportable to a construction site and which is easily set up, operated and stored again to increase the overall efficiency, and consequently the profitability, of the insulation spraying process.

In keeping with these objectives, the present invention takes the form of a fully integrated insulation spraying system which can be mounted on a truck for transportation to a construction site. The system includes components for conditioning the fiber insulation and conveying it to the spraying head where moisture is added to promote adhesion of the insulation. The system also includes a pneumatically powered shaver for smoothing off the sprayed insulation even with the inside face of the wall studs. The recycling side of the system includes a vacuum powered pickup for gathering the waste insulation that is shaved off, as well as components for separating the waste insulation from the incoming airstream and metering it back into the insulation sprayer. The entire system is powered by a self contained power unit which increases the portability and efficiency of the system. The power unit operates the air pumps, water pump and mechanical components of the system.

Other objects and advantages of the insulation spraying system of the present invention will become apparent upon reading and understanding the following detailed description along with the accompanying drawings.

DETAILED DESCRIPTION OF THE INVENTION

Figure 1:
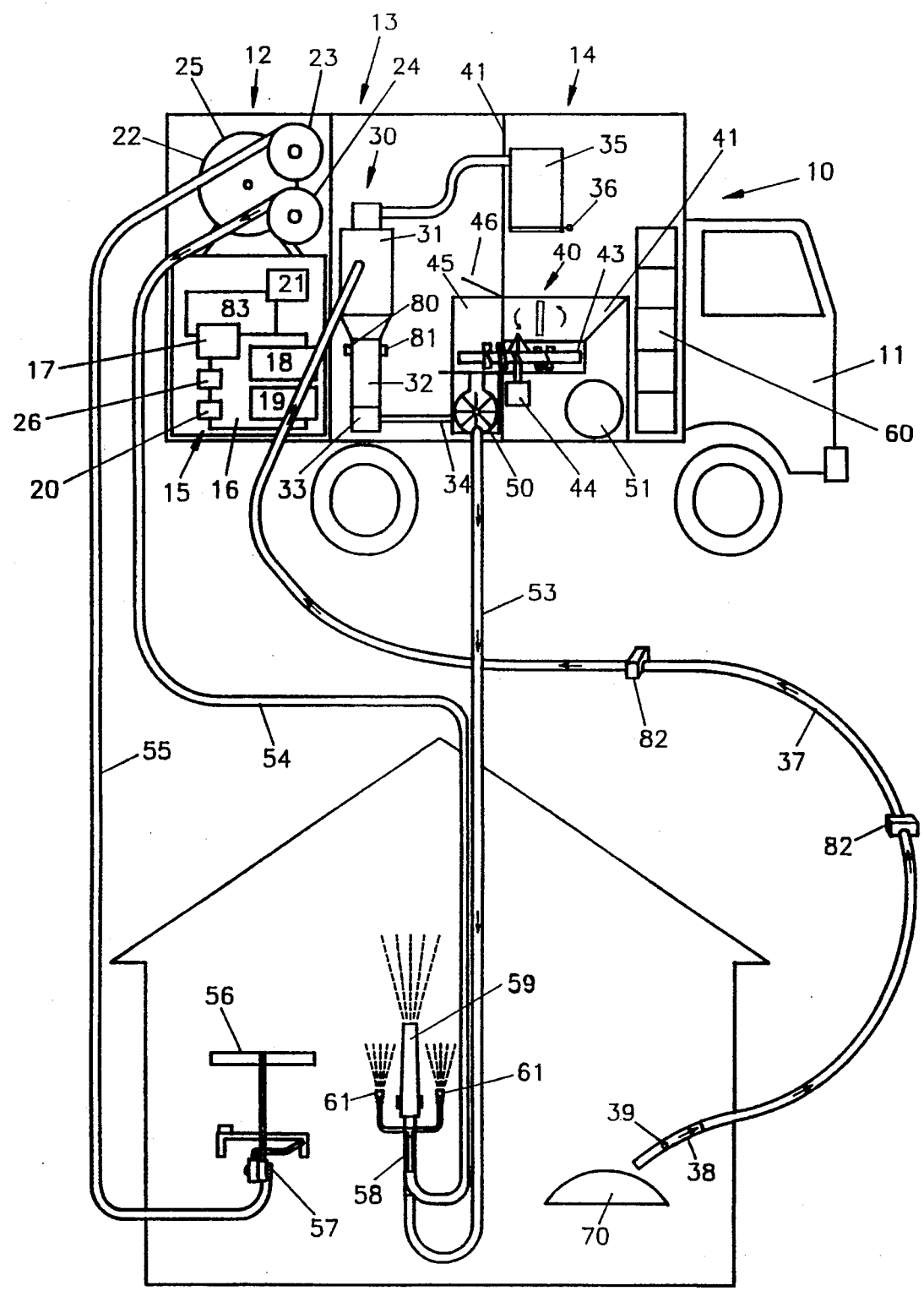
FIG. 1 shows a schematic view of the insulation spraying system.

FIG. 1 shows a schematic view of the insulation spraying system is 10. In the preferred embodiment, the system 10 is mounted on a truck 11 so that it is entirely self-contained and portable to the construction site. It should be understood that the system could equally well be mounted on a trailer, on one or more truck-transportable skids or installed in a stationary location for some applications. The truck 11 is arranged with three separate rooms 12, 13, 14. In the first room 12 is the power unit 15 that supplies the power to drive the entire system, as well as the hose storage reels 22, 23, 24, 25. The second room 13 contains the recycling subsystem 30 and the pressure side of the insulation spraying subsystem 40. The third room 14 contains the main feed hopper 42 for the insulation spraying subsystem 40, the water supply tank 51 and storage space for the insulation material 60.

Looking now in more detail at the power room 12, in the preferred embodiment, the power unit 15 is driven by a V-4 gasoline engine 16. In other embodiments, the gasoline engine 16 may be substituted with a diesel engine, an electric motor, a power-take-off driven by the truck s engine, or any other power source. The engine 16 drives a water pump 17, an air blower 18, a vacuum pump 19, a 120 VAC alternator 26, a 12 VDC generator 20, and an air compressor 21. All of these accessories are connected to the engine drive shaft by a drive train of V-belts and pulleys or other standard drive components (not shown). Power from the engine 16 is also transferred to the mechanical components in the second and third rooms 13, 14 by a drive train, including a gear reduction 83, a torque-limiting shear sprocket and a drive chain which transfers power to a drive shaft (not shown). Other drive train components such as V-belts, chain drives, gears, or hydraulic or pneumatic drives may be used in is alternate embodiments of the system. Above the power unit 16, are mounted four hose storage reels: the spray hose storage reel 25, the waste hose storage reel 22, the air hose storage reel 23, and the water hose storage reel 24.

In the second room 13, is found the fiber recovery subsystem 30 of the insulation spraying system 10. The waste insulation 70 is drawn into the waste pickup 38 and through the waste hose 37 by a vacuum from the vacuum pump 19. The airstream carrying the waste insulation enters a cyclone separator 31 which separates the bulk of the insulation fibers from the airstream. The insulation drops into a standby chamber 32 where an airlock 33 meters the recycled fibers back into the airstream from the air blower 18 before it enters the insulation spraying subsystem 40. After the cyclone separator 31, the airstream is passed through the primary filter 35 and then through a secondary filter (not shown) to filter out the remaining insulation fibers before the airstream enters the vacuum pump 19 and is exhausted to the atmosphere. Periodically, the small amount of waste insulation that gathers in the primary filter 35 can be reintroduced into the spraying process by opening a waste gate 36 at the bottom of the filter housing 35 which leads into the main hopper 42 of the insulation spraying subsystem 40. At the end of each duty cycle, the filter element in the secondary filter is cleaned off with a blast of compressed air from the air compressor 21 which is directed obliquely at the surface of the filter element to keep it clear and free flowing.

Figure 2:
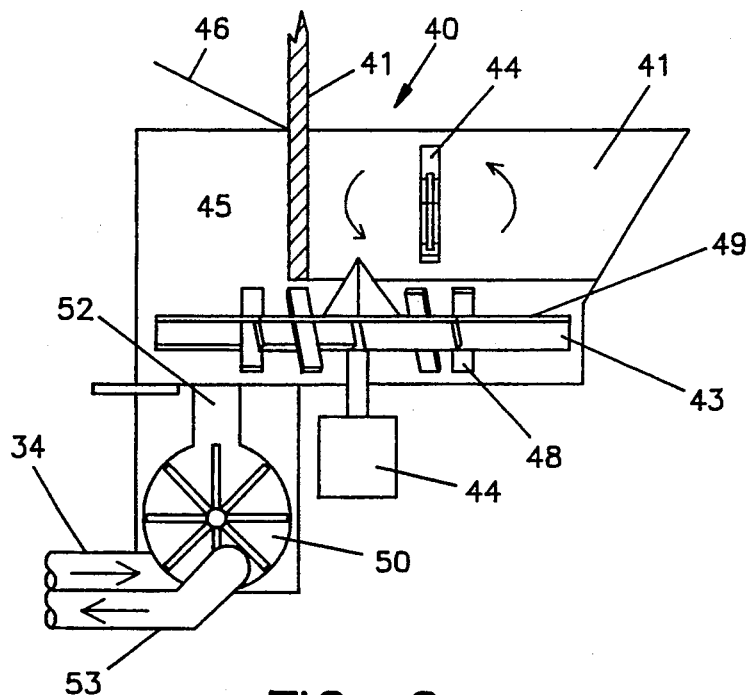
FIG. 2 shows a side view of the hopper/conveyer subsystem.
Figure 3:
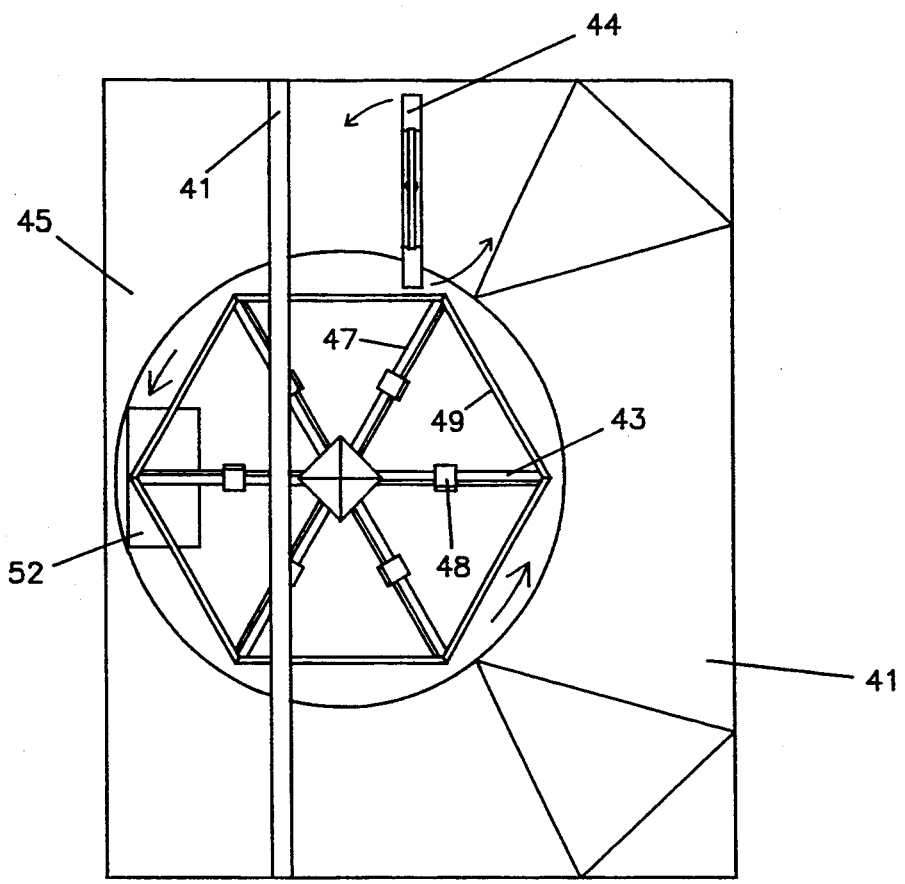
FIG. 3 shows a top view of the hopper/conveyer subsystem.

The insulation spraying subsystem 40 straddles the dividing wall 41 between the second and third rooms 13, 14 of the truck 11. The insulation spraying subsystem 40 can be seen in more detail in FIGS. 2 and 3. Bales of compressed insulation fiber 60 are fed into the main hopper 42, up to twenty-five bales at a time. At the bottom of the hopper 42 is a rotary conveyor 43 which is driven by the conveyor drive train 9 which connects to the engine 16 in the power unit 15, or a separate drive motor may be used. The rotary conveyor 43 has a plurality of radial impellers 47 which condition the insulation by fluffing it up and decompressing it. A plurality of vanes or paddies 48 may be added to the impellers 47 to increase their effectiveness, and braces 49 may be added to increase the structural rigidity of the conveyor 43. The conveyor 43 conducts the conditioned insulation from the main hopper 42 under the dividing wall 41 and into the dry insulation standby chamber 45. Optionally, the height of the dividing wall 41 from the floor of the hopper 42 may be made adjustable to regulate the flow rate of insulation into the standby chamber 45. A rotating agitator 44 prevents the insulation from building up or bridging where it passes from the main hopper 42 into the standby chamber 45. The rotation of the agitator 44 also assists in conditioning the insulation fibers. The agitator 44 may be driven off of the conveyor drive train 9, or a separate drive motor may be used.

The insulation in the dry insulation standby chamber 45 moves by gravity through a gated opening 52 into an airlock 50 which introduces the insulation fibers into an airstream supplied by the air blower 18. The dry insulation standby chamber 45 is an important feature of the present invention. In prior art insulation spraying systems, the insulation fibers moved from the main hopper directly into an airlock. The rate at which the insulation entered the airlock and its state of conditioning were highly dependent on how full the hopper was. When the hopper was first filled, more insulation could enter the airlock, but the weight of the insulation in the hopper would prevent the fibers from properly decompressing. When is the hopper was less full, the fibers were allowed to fully decompress, but the delivery rate into the airlock would have decreased. Thus, the delivery rate of insulation fibers by the prior art systems was inconsistent and they did not always condition the fibers for the maximum insulation benefit. The standby chamber 45 overcomes this problem by providing an unweighted space for the insulation fibers to expand into before they enter the airlock 50. No matter how full the main hopper 42 becomes, the insulation in the standby chamber 45 is allowed to optimally expand for maximum insulation properties, and the insulation is always delivered into the airlock 50 at a steady and predictable rate. The rate can be adjusted by opening or closing the gated opening 52 into the airlock 50.

The system is electrically controlled to operate in three possible modes: 1) dry blown insulation mode for insulating attics; 2) wet sprayed insulation without recycling, also for attic insulation, and 3) wet sprayed insulation with the insulation shaver, vacuum waste pickup and fiber recycling for insulating wails. The system's electrical controls have a number of other important features. For easier starting, a time delay relay disconnects the vacuum pump 19 from the engine 16 by means of an electric clutch whenever the starter switch for the engine 16 is engaged. Likewise, any one of the other power accessories driven off of the engine may be disconnected by means of an electric clutch. The fiber recovery subsystem 30 is protected by a vacuum sensing switch that will shut down the entire system if it detects excessive vacuum, indicating that there is a blockage or other problem in the vacuum lines. The fiber recovery subsystem 30 also has a photocell with a sending unit 80 and a receiving unit 81 mounted on the waste fiber standby chamber 32 which will temporarily disconnect the clutch to the vacuum pump 19 when the level of fibers in the standby chamber 32 exceeds a predetermined level. This prevents the fiber recovery subsystem 30 from being overwhelmed by an excess of waste fibers. The receiving unit 81 of the photocell has an adjustment for sensitivity and time delay. These allow the photocell to be tuned so that it is not sensitive to the moving fibers passing the photocell during normal operation and will only shut off the vacuum when the level of fibers exceeds the maximum level for a certain time. Another time delay relay allows the level of fibers to drop below the maximum level before the clutch to the vacuum pump 19 is reengaged.

The insulation spraying subsystem 40 and the fiber recovery subsystem 30 can be remotely controlled by the spray insulation installer with a portable radio control unit. This reduces the crew needed to operate the system to two operators. After the two operators load the hopper and start the system, one operator can control the system from inside the building while spraying insulation, and the second operator can alternately operate the insulation shaver and the vacuum pickup.

OPERATIONAL DESCRIPTION

In practice, the insulation spraying system 10 is transported to the construction site and positioned as close as practicable to the building to be insulated. The insulation hose 53 is unwound from its storage reel 25 and connected to a fitting on the main airlock 50. The other end of the insulation hose 53 is then connected to the insulation spray head 58. A sufficient length of water hose 54 is unreeled from its storage reel 24 where it is connected to the water pump 17 by a rotating fitting. The end of the water hose 54 is then connected to a fitting on the insulation spray head 58. The waste hose 37 is unwound from its storage reel 22, one end is connected to the waste pickup 38 and the other end is connected to a is fitting on the cyclone separator 31. A sufficient length of air hose 55 is unreeled from its storage reel 23 where it is connected to the air compressor 21 by a rotating fitting, and the end of the air hose 55 is connected to a fitting on the insulation shaver 56. Sandbags or specially shaped hose weights 82 may be placed over the hoses to hold them down and prevent the hoses from moving when they are pressurized. Lastly, the engine 16 is started to supply power to the insulation spraying system 10. The entire setup process can be completed in a matter of a few minutes, and there is absolutely no heavy equipment that needs to be moved by hand. The ease of setup, by itself, is a major improvement over all the known prior art.

To begin the spraying operation, bales of compressed insulation fiber 60, preferably reprocessed cellulose fiber, are unwrapped and fed into the main hopper 42, up to twenty-five bales at a time. The hopper design eliminates the need to have a worker constantly feeding bales of insulation s into the spraying system, thereby freeing up a worker for other activities. The rotating conveyor 43 and the agitator 44 break up the bales and decompress the fibers to condition them for the maximum insulation benefit. The conveyor 43 carries a certain amount of insulation past the dividing wall 41 and into the standby chamber 45 where it is allowed to expand without the weight of the insulation in the hopper 42 to compress it. The insulation falls through the gated opening 52 into the main airlock 50. The air blower 18, which should be a low pressure, high volume compressor such as a roots-type compressor, creates an airstream which passes first through the recycled fiber airlock 33, then through the main airlock 50. The main airlock 50 introduces the insulation fibers into the airstream which carries them through the insulation spray hose 53 to the insulation spray head 58. As the insulation exits the insulation nozzle 59, water or a liquid adhesive is sprayed onto the insulation by two or more water jets 61. The moistened insulation is sprayed onto the walls of the building until a layer of the desired thickness is achieved.

After the walls have been sprayed with insulation to the desired thickness, any overspray, or unevenness in the insulation layer is smoothed out with a motorized insulation shaver 56. In the preferred embodiment, the insulation shaver 56 is driven with a pneumatic motor 57 powered by compressed air from the high pressure air compressor 21. This has advantages over the prior art electric powered insulation shavers. The pneumatic powered shaver is lighter than its electric counterpart, it has higher startup torque so it is less likely to stall and if it does stall there is no damage to the pneumatic motor, unlike an electric motor, so it has a longer service life and it eliminates the danger of electrical shock.

The damp insulation which is shaved off of the walls and any loose s insulation which falls to the floor are vacuumed up with the waste pickup 38. A vacuum control vent 39 is built into the tubular body of the pickup 38. Since the insulation shaving step and the waste pickup step are much less time consuming than the insulation spraying process, one operator can perform both tasks, while a second operator controls the spraying. This results in a very efficient use of the work crew and a significant labor savings compared to the prior art method of sweeping up and shoveling the waste insulation for disposal or recycling. Further labor savings could be realized by combining the pneumatic shaver 56 with the waste pickup 38 into one device so that the operations can be carried out simultaneously.

After it is picked up, the damp waste insulation moves through the waste hose 37 to the cyclone separator 31 which uses centrifugal force to separate the insulation fibers from the airstream. The insulation fibers fall into the standby chamber 32 where they are held until the recycled fiber airlock 33 meters them into the airstream from the air blower 18. The airstream with the recycled fibers suspended in it passes through an airduct 34 into the main airlock 50 where dry insulation fibers are added to the recycled fibers. This mixture of new and recycled fibers is sprayed onto the walls in the normal manner as describe above.

To keep the ratio of new to recycled fibers as consistent as possible the recycled fiber airlock 33 should be sized to deliver about twenty percent of the volume of insulation into the airstream as the main airlock 50. This ratio may be made adjustable by using gated openings into one or both of the airlocks as described above or by varying the drive speed of one airlock with respect to the other. Using two separate airlocks to meter the new and recycled fibers into the airstream gives a number of s advantages over the prior art systems. It provides optimum use of the recycled fibers because the waste is reintroduced into the process at the same rate it is produced. Unlike shoveling the waste back into the hopper with the new fibers, the two airlock system ensures a steady rate of recycled fibers introduced into the airstream so that there are never any large lumps of damp material that could clog the spraying system. Likewise, the composition of the sprayed insulation layer is always consistent and of a high quality. There is no danger of spraying whole sections of the wall with too high a percentage of recycled fibers as there is with prior art systems that reuse process waste.

Thus, it can be seen that the insulation spraying system of the present invention provides a transportable, self-contained insulation spraying system that results in higher quality sprayed insulation, greater efficiency, reduced labor costs, and nearly one hundred percent utilization of the insulation material. Because the system reintroduces normally wasted insulation back into the spraying process, spray insulation installers will no longer be faced with the tradeoff between work speed and efficient use of the raw material. The entire spraying operation can be speeded up with no compromise in quality or material waste, resulting in even greater efficiency and reduced labor costs.

Although the examples given include many specificities, they are intended as illustrative of only one possible embodiment of the invention. Other embodiments and modifications will, no doubt, occur to those skilled in the art. For instance, one modification contemplated by the inventor is to use one air compressor to provide both the low pressure air and the vacuum for the system. By using the inlet of the compressor for the vacuum and the outlet for the air blower, the user could realize some savings on equipment costs, as well as energy costs for running the system. Also, the system could easily be arranged in one or two or more rooms instead of the three room arrangement described. Thus, the examples given should only be interpreted as illustrations of some of the preferred embodiments of the invention, and the full scope of the invention should be determined by the appended claims and their legal equivalents.

I claim:

1. An insulation spraying system, comprising:
    an insulation spraying means for spraying insulation fibers,
    a fiber recovery means for recovering waste insulation fibers,
    and means for introducing said waste insulation fibers into said insulation spraying means,
    wherein said insulation spraying means comprises a main hopper for receiving said insulation fibers, a standby chamber separated from said main hopper by a dividing wall having an opening therethrough, a conveyor means for conveying said insulation fibers from said main hopper through said opening into said standby chamber, and an airlock means connected to said standby chamber for introducing said insulation fibers into a moving airstream.

2. The insulation spraying system of claim 1, wherein said fiber recovery means comprises a vacuum source for drawing said waste insulation fibers into said fiber recovery means, a separation means for collecting said waste insulation fibers and a second airlock means for introducing said waste insulation fibers into said moving airstream.

3. The insulation spraying system of claim 2, wherein said separation means comprises a cyclone separator.

4. The insulation spraying system of claim 2, wherein said separation means comprises at least one filter.

5. The insulation spraying system of claim 1, wherein said conveyor means comprises a rotary conveyor having a plurality of radial impellers which convey said fibrous insulation from said main hopper through said opening into said standby chamber.

6. The insulation spraying system of claim 1, wherein said insulation spraying system is mounted on a vehicle for transportation to the point of use.

7. An insulation spraying system, comprising:
    a main hopper for receiving fibrous insulation,
    a standby chamber separated from said main hopper by a dividing wall having an opening therethrough,
    a conveyor means for conveying said fibrous insulation from said main hopper through said opening into said standby chamber,
    and an airlock means connected to said standby chamber for introducing said fibrous insulation into a moving airstream.

8. The insulation spraying system of claim 7, wherein said conveyor means comprises a rotary conveyor having a plurality of radial impellers which convey said fibrous insulation from said main hopper through said opening into said standby chamber.

9. An insulation spraying system, comprising:
    an insulation spraying means for spraying fibrous insulation, including a main hopper for receiving said fibrous insulation, a standby chamber separated from said main hopper by a dividing wall having an opening therethrough, a conveyor means for conveying said fibrous insulation from said main hopper through said opening into said standby chamber, and an airlock means connected to said standby chamber for introducing said fibrous insulation into a moving airstream,
    and a fiber recovery means for recovering waste insulation fibers, including a vacuum source for drawing said waste insulation fibers into said fiber recovery means, a separation means for collecting said waste insulation fibers and a second airlock means for introducing said waste insulation fibers into said moving airstream.

10. The insulation spraying system of claim 9, wherein said separation means comprises a cyclone separator.

11. The insulation spraying system of claim 9, wherein said separation means comprises at least one filter.

12. The insulation spraying system of claim 9, wherein said insulation spraying system is mounted on a vehicle for transportation to the point of use.

13. The insulation spraying system of claim 9, wherein said conveyor means comprises a rotary conveyor having a plurality of radial impellers which convey said fibrous insulation from said main hopper through said opening into said standby chamber.

* * * * *